(12) United States Patent
Damery et al.

(10) Patent No.: US 7,407,335 B2
(45) Date of Patent: Aug. 5, 2008

(54) BRAILLE DISPLAY FOR USE WITH A NOTETAKER AND WITH PERSONAL COMPUTERS FOR BLIND AND LOW VISION USERS

(75) Inventors: Eric Damery, Odessa, FL (US); Lee Hamilton, Tampa, FL (US); Glen Gordon, Madison, WI (US); Bradley S. Davis, Indian Shores, FL (US); Casimir M. Wojcik, Redington Shores, FL (US); Sharon Spencer, Oldsmar, FL (US); Chris Hofstader, St. Petersburg, FL (US)

(73) Assignee: Freedom Scientific Inc., St. Petersburg, FL (US)

( * ) Notice: Subject to any disclaimer, the term of this patent is extended or adjusted under 35 U.S.C. 154(b) by 390 days.

(21) Appl. No.: 10/632,262

(22) Filed: Aug. 1, 2003

(65) Prior Publication Data

US 2005/0117952 A1 Jun. 2, 2005

Related U.S. Application Data

(60) Provisional application No. 60/400,094, filed on Aug. 1, 2002.

(51) Int. Cl.
*B41J 5/08* (2006.01)
(52) U.S. Cl. .................... 400/109.1; 400/483; 434/113; 434/114

(58) Field of Classification Search ............ 400/109.1, 400/483; 434/113, 114
See application file for complete search history.

(56) References Cited

U.S. PATENT DOCUMENTS

| 4,445,871 | A | * | 5/1984 | Becker ....................... 434/114 |
| 4,871,992 | A | * | 10/1989 | Petersen .................. 340/407.1 |
| D310,352 | S | * | 9/1990 | Kato et al. .................. D18/4.5 |
| 4,985,692 | A | * | 1/1991 | Breider et al. ........... 340/407.2 |
| 5,466,154 | A | * | 11/1995 | Thompson .................. 434/114 |
| 6,163,280 | A | * | 12/2000 | Breider ......................... 341/21 |
| 6,827,512 | B1 | * | 12/2004 | Souluer ....................... 400/483 |
| 7,029,190 | B1 | * | 4/2006 | Davis et al. ................. 400/483 |
| 2002/0005707 | A1 | * | 1/2002 | Kerai et al. .................. 320/106 |
| 2003/0122689 | A1 | * | 7/2003 | Romeo et al. ................. 341/21 |

FOREIGN PATENT DOCUMENTS

DE    19613318 A1 *   7/1997

* cited by examiner

*Primary Examiner*—Daniel J. Colilla
*Assistant Examiner*—Kevin D WIlliams
(74) *Attorney, Agent, or Firm*—Holland & Knight LLP

(57) ABSTRACT

A Braille display for use by blind and low vision users. The Braille display can be detachably mounted on a notetaker which includes either a Braille keyboard or a conventional QWERTY keyboard and a memory for storing in digital form information which is entered through the keyboard. Preferably, the Braille display includes a conventional port for connecting through a cable to a personal computer or other computer operated device for displaying information.

3 Claims, 4 Drawing Sheets

BRAILLE DISPLAY FOR USE WITH A NOTETAKER AND WITH PERSONAL COMPUTERS FOR BLIND AND LOW VISION USERS

BACKGROUND OF THE INVENTION

Various Braille products are available for blind and low vision users for use in taking notes. These include personal computers having a keyboard and a refreshable Braille display and/or synthesized speech for reading text outloud. The keyboard may be of a conventional QWERTY type or a Braille keyboard. In some cases, the computer may have synthesized speech capability for reading digital text which was entered through a keyboard or which is obtained from other sources, such as from a CD-ROM, from a scanner, from the computer's internal memory or from a local or a global network.

Small special purpose portable computers, sometimes known as notetakers, are available for blind and low vision users. For example, the Braille'n Speak notetaker manufactured and sold by Freedom Scientific Inc. includes a standard Perkins-style Braille keyboard for inputting information which is stored in an internal memory. In response to a single command, stored information is read back to the user using a built-in speech synthesizer. In order to minimize the product weight and cost, the product does not have a Braille display. Notetakers also are available with a conventional QWERTY keyboard for users who prefer this type of keyboard or who are not skilled in Braille.

Notetakers also are available with an integral Braille display located adjacent the keyboard to allow users to read stored text. The Braille display consists of a row of Braille cells. Each cell has a grid of pins which can be selectively raised to form letters and characters in Braille. These notetakers are larger, heavier and more costly than notetakers which do not have a Braille display.

In addition to being useful for taking notes, some notetakers include software for performing other functions which are commonly found on a laptop computer, such as software for maintaining a calendar for the user and for maintaining a contact list of names, address and telephone numbers. These notetakers can function as a personal digital assistant (PDA).

Light weight notetakers are particularly useful for students, business persons and those who travel, since they are easily carried. The lightest and most portable notetakers do not include a Braille display. Consequently, users desiring the lightest weight product have had to forego products having an integral refreshable Braille display. At times, it is useful for the user to have a refreshable Braille display for these notetakers, for example, to facilitate reviewing and editing notes. Users would sometimes connect their notetakers to personal computers which are connected to a refreshable Braille display for reading and editing information stored in the notetaker.

BRIEF SUMMARY OF THE INVENTION

The invention is directed to a small refreshable Braille display accessory which may be removably mounted on a notetaker or on a personal digital assistant of a type designed for blind and low vision users. The refreshable Braille display is mounted to extend across a back side or, preferably, a front side of a notetaker and to connect to the notetaker without cables. Data and control functions are automatically made through the connection between the refreshable Braille display and the notetaker when the display is attached to the notetaker. Preferably, the Braille display is connected to and receives power from a USB port on the notetaker. The data to be displayed also passes through the USB port. Alternately, the Braille display may have an internal battery power source, or it may receive power from the battery or other power source for the notetaker through a connector separate from the data port. Preferably, power to the Braille display is controlled with the switch which turns the notetaker on and off. The Braille display may include one or more ports, such as a standard USB port, an RS232 connector, an IR port, or a Bluetooth wireless technology port which allows the display to also be used with personal computers and other computer products on which the Braille display does not mount.

DETAILED DESCRIPTION OF THE INVENTION

Figure 1:
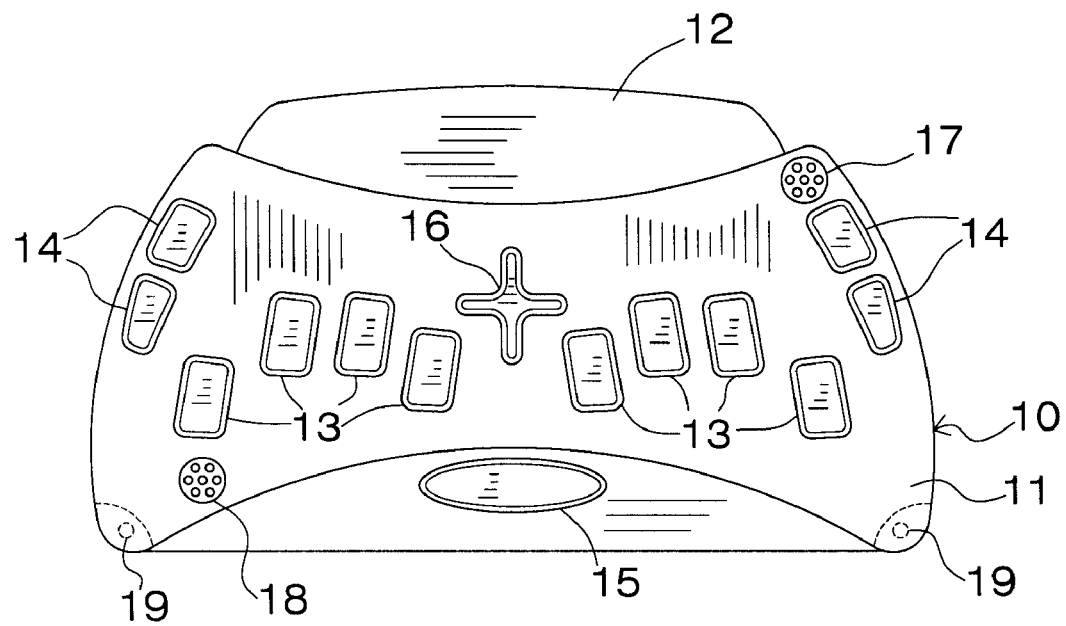
FIG. 1 is a top front perspective view of a light weight notetaker having a Braille keyboard and without a refreshable Braille display for use by blind and low vision users.

FIG. 1 of the drawings illustrates an exemplary notetaker 10 designed for use by blind and low vision users. The notetaker 10 includes a housing 11 and a removable battery pack 12 attached to the housing 11. The top of the housing 11 includes a number of keys which form a keyboard for a user to interact with the notetaker 10. The keys include eight keys 13 forming a Braille keyboard for entering test information, four keys 14 which are functions keys, a space bar key 15, and a cross shaped key 16 for positioning a cursor. The notetaker also includes a microphone 17 and a speaker 18. Clips 19 may be present on the housing 11 for attaching a carrying strap. Not seen in the drawing are various connectors, ports and slots. For example, the sides of the housing 11 may include a slot for receiving a memory card, a serial port, a USB port, a battery charger input, an infrared data port, a Bluetooth wireless port and a power switch.

Figure 2:
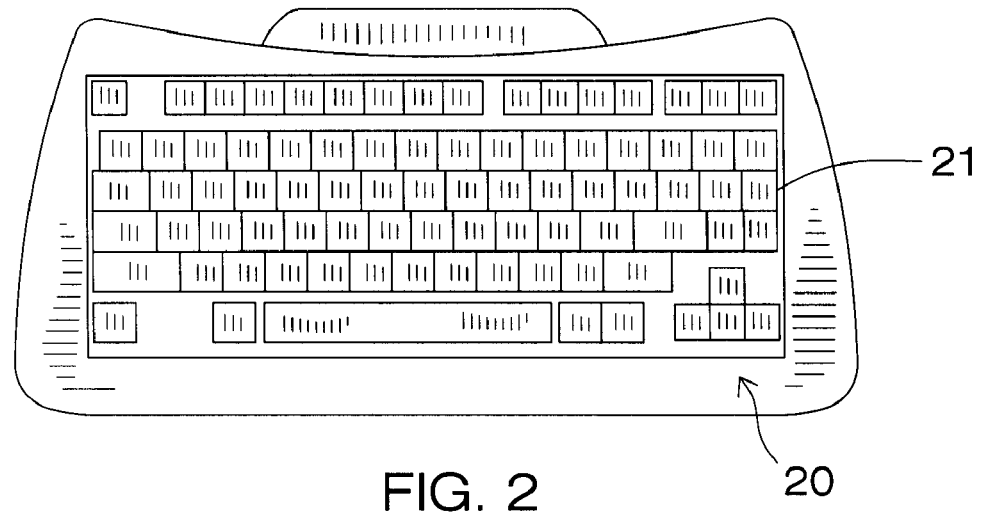
FIG. 2 is a top front perspective view of a light weight notetaker having a conventional QWERTY keyboard and without a refreshable Braille display for use by blind and low vision users.

FIG. 2 illustrates a notetaker 20 which is similar in function to the notetaker 10, except that the notetaker 20 has alphanumeric keys 21 arranged in the conventional QWERTY keyboard format.

Figure 3:
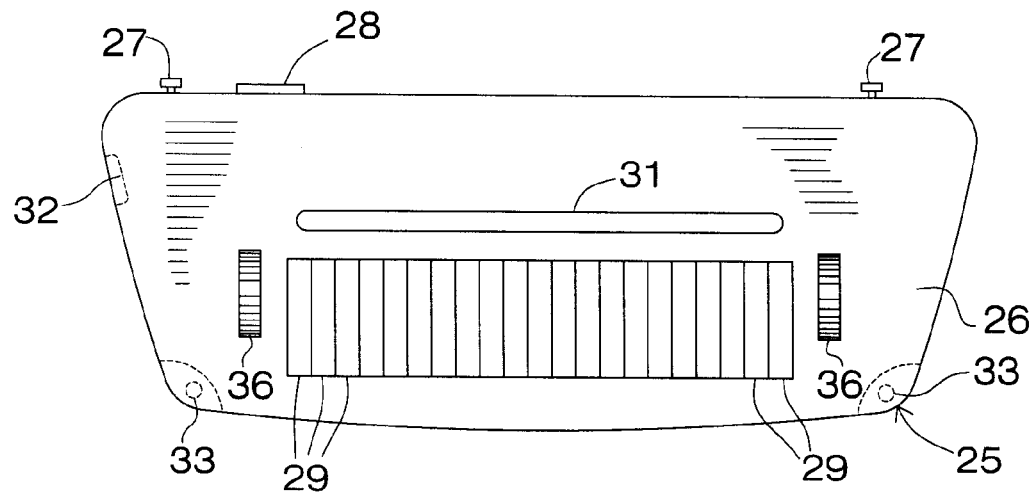
FIG. 3 is a top plan view of a refreshable Braille display for attachment to the notetaker of FIG. 1 according to the invention.

The invention is directed to a refreshable Braille display accessory which may be removably mounted on a notetaker of the type designed for blind and low vision users. FIG. 3 illustrates an exemplary refreshable Braille display 25 according to the invention. The display 25 includes a housing 26 which is adapted to attach to the notetaker, for example, with pins 27 which engage and are releasably locked into mating slots on the notetaker. The housing 26 carries one or more connectors 28 which slide into mating connectors on the notebook housing. The connectors 28 are designed to automatically establish electrical connections between the refreshable Braille display 25 and an attached notetaker. In the simplest form, only a single USB port is needed to provide power, control and data connections between the notetaker to the display 25.*s*.

The display 25 includes a plurality of cells 29 arranged in a row. Each cell 29 displays a single character in the Braille format. Displays 25 may be sold, for example, with different numbers of cells 29. For example, a manufacturer may sell a 20 cell display and a 40 cell display, since the cost of the Braille cells is a significant portion of the cost of the display 25. The display 25 also may include various known devices for scrolling through text on the display. For example, the display 25 may include one or more wheels 30 which can advance the displayed text, for example, line-by-line or paragraph-by-paragraph. A touch responsive a conventional slider or advance bar 31 also may be provided to position a cursor in line of text to facilitate editing the text.

Preferably, the refreshable Braille display 25 also includes a conventional USB port 32 for connection through a cable to a personal computer (not shown). This will provide versatility by allowing the owner to use the Braille display 25 either with a notetaker 10 which mounts to the display, or, through a standard PC port such as a USB port or and IR port or an RS232 connection, with a personal computer. If a connection is made through a USB port, the port may provide sufficient power for operating the display 25, or a separate low voltage DC power source may be used to power the display 25.

Figure 4:
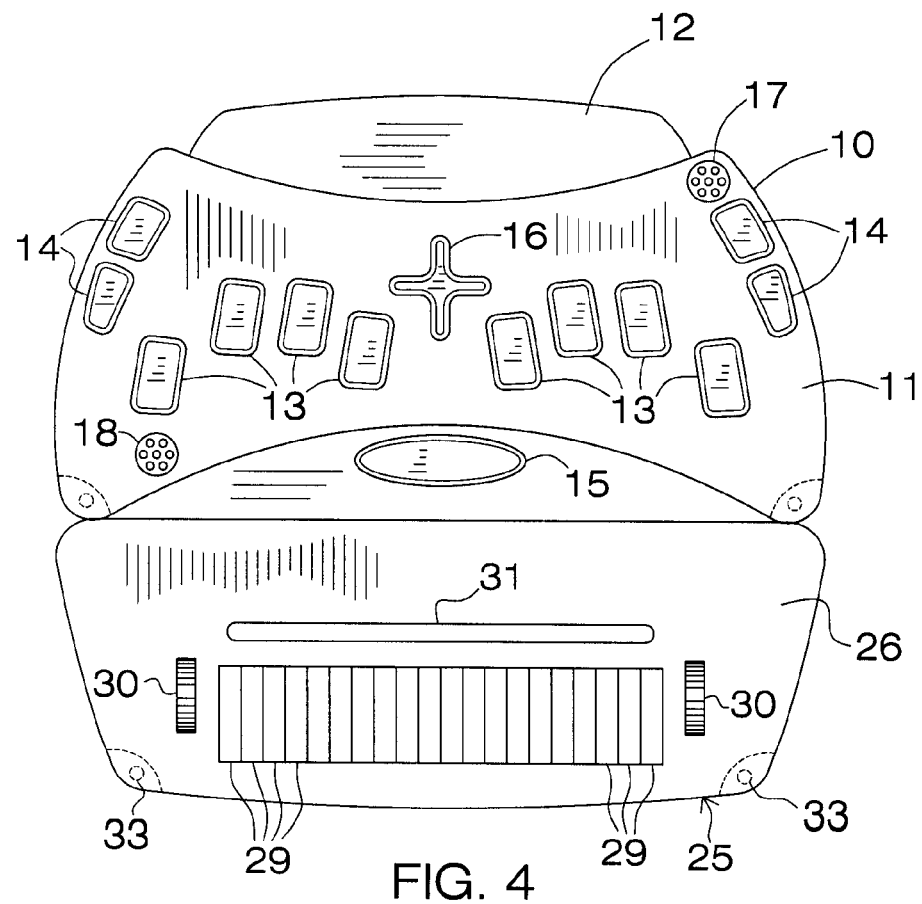
FIG. 4 is a top plan view of the notetaker of FIG. 1 with the refreshable Braille display of FIG. 3 attached.

When the Braille display 25 is attached to extend across a back or, preferably, a front side of the notetaker 10, as shown in FIG. 4, electrical connections for data and control functions are automatically made between the display 25 and the notetaker 10 via the connector 28, without any cable or external connections. Optionally, the connector on the notetaker 10 which is engaged by the connector 28 on the display 25 may be provided with a protective cover (not shown) which automatically retracts or opens when the display 25 is attached to the notetaker 10. It is desirable to protect the electrical contacts on the notetaker 10 from contamination with dirt and liquids and from contact with objects which could short together connector contacts on the notetaker. It also is preferable that the connections for releasably mounting the display 25 on the notetaker 10 be easy to use by a blind or low vision user.

The Braille display 25 may have an internal battery power source (not shown), or it may be powered from an attached notetaker. Preferably, power to the Braille display is controlled by the notetaker's power switch.

The notetaker 10 and attached Braille display 25 may be designed so that they may be used on a flat desktop, on a user's lap or when standing using a carrying strap (not shown) attached to hooks 33 on the display 25.

Figure 5:
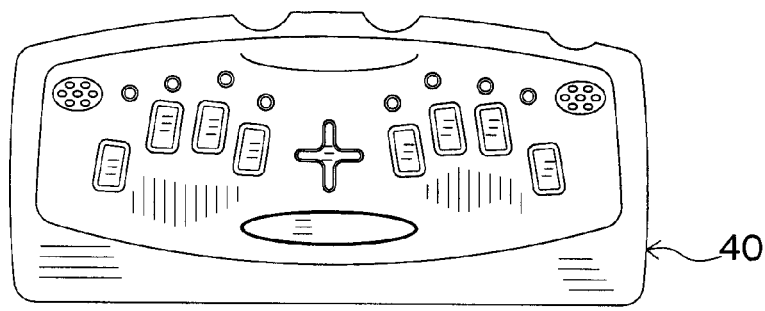
FIG. 5 is a top plan view of a modified embodiment of a notetaker.
Figure 6:
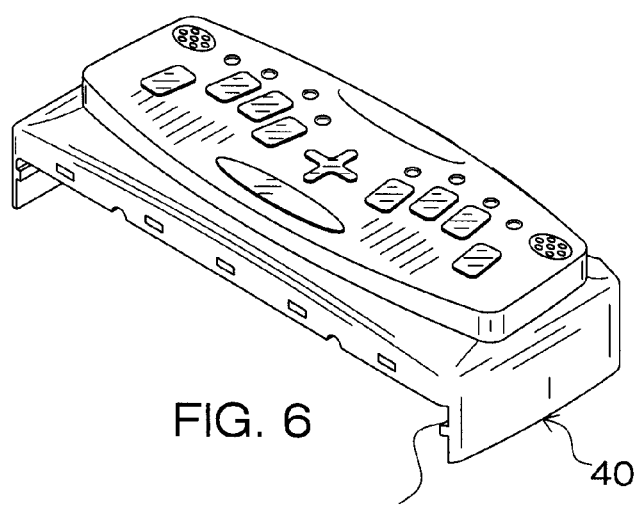
FIG. 6 is a perspective view of the notetaker of FIG. 5 as seen from the lower right front, showing an open slot where the notetaker attaches to a Braille display according to the invention.
Figure 7:
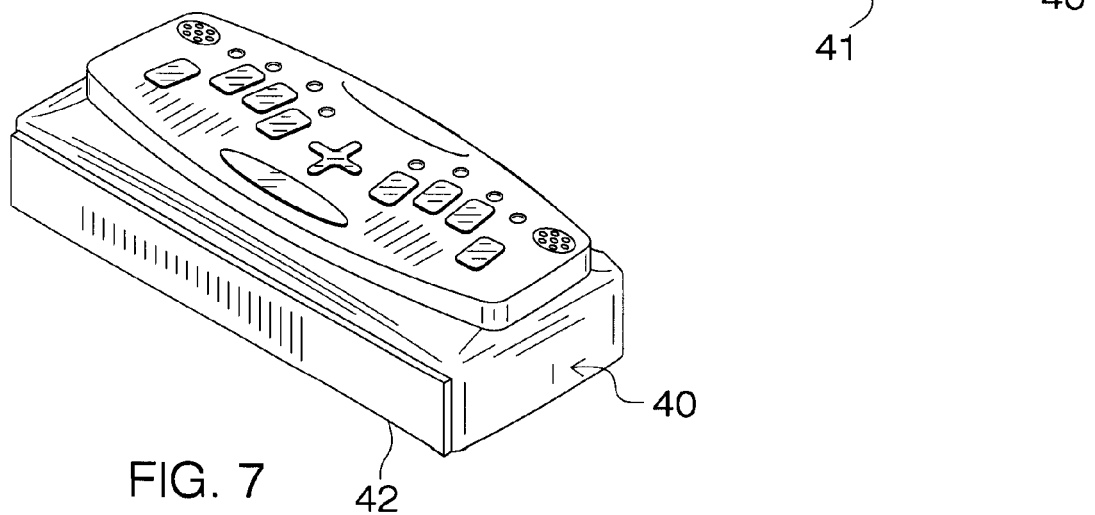
FIG. 7 is a perspective view of the notetaker of FIG. 6 with an insert filling the Braille display slot.

FIGS. 5-7 show a modified embodiment of a notetaker 40 according to the invention. In FIG. 6, the notetaker 40 is shown as having an open slot 41 across its lower front side for engaging a Braille display. FIG. 7 shows a cover 42 for the slot 41 which may be used when the notetaker 40 is not mounted to a Braille display. The cover 42 provides protection for terminals on connectors in the slot 41.

Figure 8:
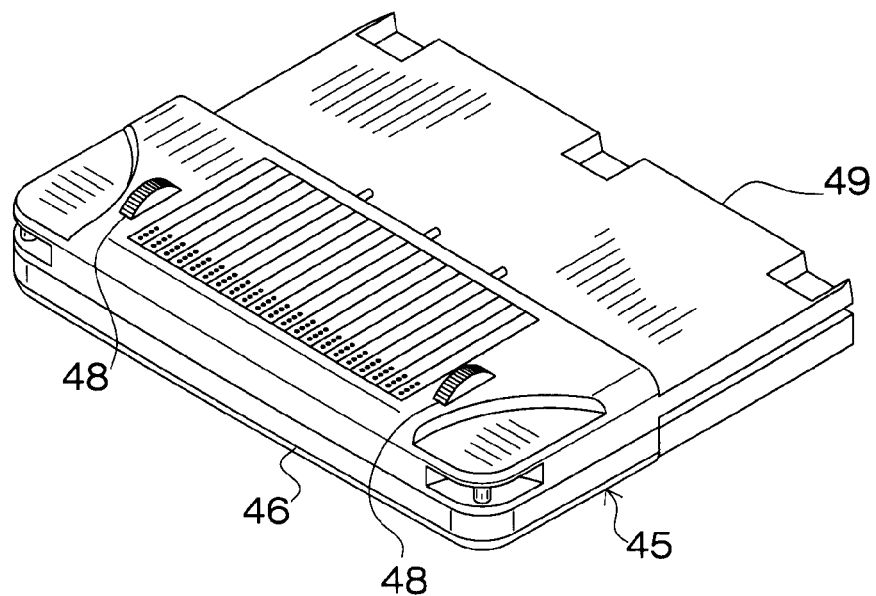
FIG. 8 is a perspective view of a modified embodiment of a Braille display according to the invention.
Figure 9:
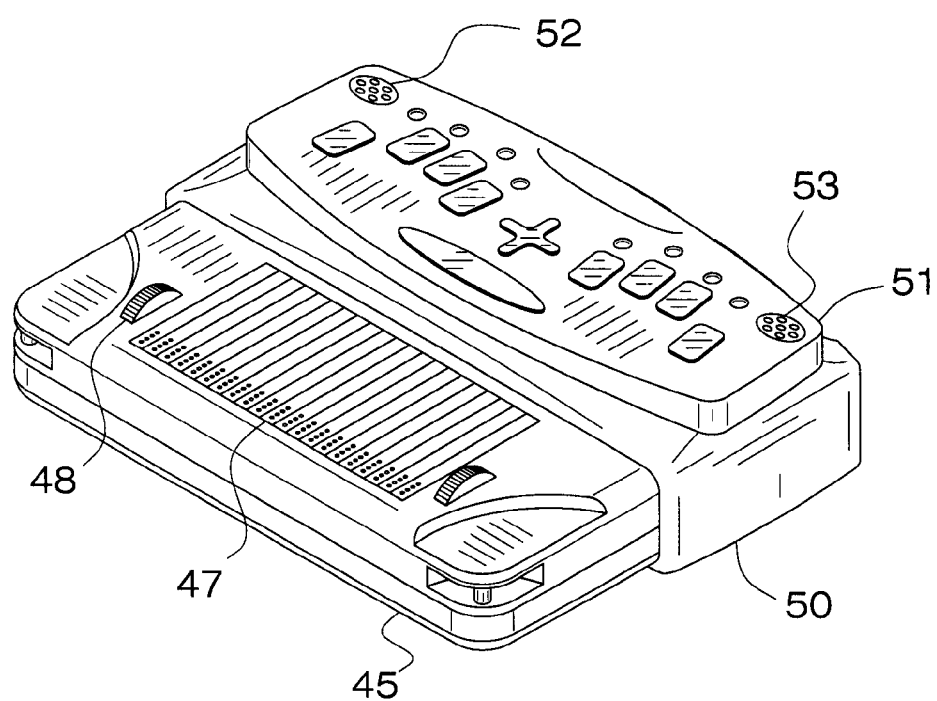
FIG. 9 is a perspective view showing a notetaker attached to the Braille display of FIG. 8.

FIG. 8 shows a refreshable Braille display 45 according to a modified embodiment of the invention. The display 45 includes a front portion 46 including row of cells 47 and navigation wheels 48 adjacent each end of the row of cells 47. A rear portion 49 of the display 45 is shaped to be received by a slot on a notetaker and includes connectors for making power, data and control connections between the display 45 and the notetaker. FIG. 9 shows the refreshable Braille display 45 attached to a notetaker 50. The Braille display 45 is detachably mounted on the notetaker 50 by sliding the back portion 49 of the Braille display 45 into a complementary groove on the notetaker 50. The Braille display 45 and the notetaker 50 may be held together by friction, or by a suitable latch, the design of which will be apparent to those skilled in the art. The notetaker 50 includes a keyboard section 51, which may be a Braille keyboard, a QWERTY keyboard, or of any other suitable design. The notetaker 50 also may include a speaker 52 and a microphone 53. Preferably, the notetaker 50 includes an internal rechargeable battery (not shown) which powers both the notetaker 50 and the Braille display 45. Alternately, the battery can be located in the Braille display 45, or the Braille display 45 and the notetaker 50 may have separate batteries.

It will be appreciated that the illustrated Braille displays and of the notetakers are exemplary and that changes to their design will be apparent to those skilled in the art without departing from the invention. Also, a single Braille display according to the invention may be adapted to attach to a variety of different notetakers.

The invention claimed is:

1. A system for assisting a blind and or low vision user with taking notes, the system comprising:

a portable Braille notetaker dimensioned to fit upon the lap of the user, the Braille notetaker including a housing with first and second opposing faces and with slots and a connector formed along the first face, the housing further including a number of clips for securing the Braille notetaker to a carrying strap, the Braille notetaker further including;

a battery pack removably attached to the second face of the housing, the battery pack functioning to power the Braille notetaker;

a keyboard for inputting information, the keyboard including at least eight keys that together constitute a Braille keyboard, whereby the inputted information corresponds to Braille characters;

a speaker;

the system further including a portable refreshable Braille display dimensioned to fit upon the lap of the user, the Braille display including a housing with first and second opposing faces, pins and a mating connector extending from the first face of the Braille display, the pins adapted to be inserted within the slots of the Braille notetaker with the connector and mating connector in engagement, whereby the Braille notetaker and the Braille display can be removably coupled to one another and wherein power and data can be routed from the Braille notetaker to the Braille display by way of the connector and mating connector without the use of additional cables, the Braille display further including;

a plurality of Braille cells, with each cell capable of displaying a single character in the Braille format, the plurality of Braille cells generating text;
a wheel for advancing the text generated by the Braille cells;
a switch for controlling whether the Braille display receives power from the battery pack of the Braille notetaker.

2. The system as set forth in claim 1, wherein the connector is a USB port.

3. The system as set forth in claim 1, wherein the Braille display includes a port adapted to be connected to a personal computer for receiving data to be displayed.

* * * * *